US 6,578,048 B1

(12) United States Patent
Mauldin

(10) Patent No.: US 6,578,048 B1
(45) Date of Patent: **\*Jun. 10, 2003**

(54) METHOD FOR CONSTRUCTING A CATALOG OF THE FILES ON A NETWORK AND A CATALOG SO CONSTRUCTED

(75) Inventor: Michael L. Mauldin, Penn Hills, PA (US)

(73) Assignee: Carnegie Mellon University, Pittsburgh, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 731 days.

(21) Appl. No.: 08/937,392

(22) Filed: Sep. 25, 1997

Related U.S. Application Data

(62) Division of application No. 08/462,520, filed on Jun. 5, 1995.

(51) Int. Cl.[7] ............................................. G06F 17/30
(52) U.S. Cl. ..................... 707/104.1; 707/10; 715/513; 715/501
(58) Field of Search .............................. 707/5, 10, 104, 707/104.1; 395/200.59, 187.01, 200.31, 200.33; 704/9; 715/513, 501

(56) References Cited

U.S. PATENT DOCUMENTS

| | | | | |
|---|---|---|---|---|
| 4,713,754 A | * | 12/1987 | Agrawal et al. | ............ 364/200 |
| 5,355,472 A | | 10/1994 | Lewis | ........................ 707/513 |
| 5,408,655 A | * | 4/1995 | Oren et al. | ..................... 707/3 |
| 5,446,740 A | * | 8/1995 | Yien et al. | ............... 370/110.1 |
| 5,446,891 A | * | 8/1995 | Kaplan et al. | .................. 707/3 |

(List continued on next page.)

FOREIGN PATENT DOCUMENTS

EP 0718783 A1 6/1996

OTHER PUBLICATIONS

*New Spiders Roam the Web*, Computer–Mediated Communication Magazine, vol. 1, No. 5, Sep. 1, 1994, p. 3, John December.
*Web Agent Related Research at the center for Machine Translation*, To be presented at the SIGNIDR meeting, Aug. 4, 1994 in McLean, Michael L. Mauldin, John R. R. Leavitt.
A. Emtage and P. Deutsch, "Article—Archie—An Electronic Directory Service for the Internet," Proc. Usenix Winter 1992 Tech. Conf., Usenix Assoc., Berkeley, Calif., 1992, pp. 93–110.

(List continued on next page.)

*Primary Examiner*—Frantz Coby
(74) *Attorney, Agent, or Firm*—Kirkpatrick & Lockhart LLP

(57) ABSTRACT

A method of constructing a catalog of the files stored on the network comprised of a plurality of interconnected computers each having a plurality of files stored thereon is comprised of the following steps:
  (a) establishing a queue containing at least one address representative of a file stored on one of the interconnected computers;
  (b) ranking each address in the queue according to the popularity of the file represented by that address;
  (c) downloading the file corresponding to the address in the queue having the highest ranking;
  (d) processing the downloaded file to generate certain information about the downloaded file for the catalog;
  (e) adding to the queue any addresses found in the downloaded file;
  (f) determining the popularity of the files represented by the addresses in the queue according to how often a file is referenced by a computer other than the computer on which the file is stored; and
  (g) repeating steps (b) through (g).

3 Claims, 11 Drawing Sheets

U.S. PATENT DOCUMENTS

| | | | | |
|---|---|---|---|---|
| 5,488,725 A | * | 1/1996 | Turtle et al. | 707/4 |
| 5,530,852 A | * | 6/1996 | Meske, Jr. et al. | 707/10 |
| 5,557,787 A | | 9/1996 | Shin et al. | 707/102 |
| 5,572,643 A | * | 11/1996 | Judson | 395/793 |
| 5,603,025 A | | 2/1997 | Tabb et al. | 707/2 |
| 5,623,652 A | * | 4/1997 | Vora et al. | 707/10 |
| 5,625,781 A | * | 4/1997 | Cline et al. | 395/335 |
| 5,634,049 A | | 5/1997 | Pitkin | 707/102 |
| 5,634,062 A | | 5/1997 | Shimizu et al. | 707/501.1 |
| 5,634,121 A | | 5/1997 | Tracz et al. | 707/2 |
| 5,678,041 A | * | 10/1997 | Baker et al. | 707/9 |
| 5,748,954 A | * | 5/1998 | Mauldin | 707/10 |
| 5,787,416 A | | 7/1998 | Tabb et al. | 707/2 |
| 5,799,268 A | * | 8/1998 | Boguraev | 704/9 |
| 5,953,732 A | | 9/1999 | Meske, Jr. et al. | 707/513 |

OTHER PUBLICATIONS

M. Koster, "Aliweb—Archie–Like Indexing in the Web," Proc. First Int'l World Wide Web Conf., Elsevier Science, Amsterdam, 1994, pp. 175–182.

McBryan, "GENVL and WWWW: Tools for Taming the Web," WWW:http://www.cs.colorado.edu/home/mcbryan/home.html (1994).

D. Eichmann, "The RBSE Spider—Balancing Effective Search against Web Load," Proc. First Int'l World Wide Web Conf., Elsevier Science, 1994.

B. Pinkerton, "Finding What People Want: Experiences with the WebCrawler," http://info.webcrawler.com/bp/www94.html.

M. Koster, "Guidelines for Robots Writers," http://info.Webcrawler.com/mak/projects/robots/guidelines.html.

Duda et al., Content Routing in a Network of WAIS Servers, Distributed Computing Systems., IEEE Proceedings of the 14th International Conference, pp. 124–132, Jun. 1994.*

Examiner's Exhibit A, printed p. 1.*

Army Pearl, Sun's Link Service A Protocol for Open Linking, Nov. 1989, Hypertext '89 Procedings, pp. 137–146.*

Dennis J. Bouvier, Versions and Standards of HTML, ACM SIGAPP Applied Computing Review, vol. 3, Issue 2, Fall 1995, pp. 9–15.*

* cited by examiner

METHOD FOR CONSTRUCTING A CATALOG OF THE FILES ON A NETWORK AND A CATALOG SO CONSTRUCTED

This is a divisional of application(s) Ser. No. 08/462,520 filed on Jun. 5, 1995

BACKGROUND OF THE INVENTION

1. Field of the Invention

The present invention is directed generally to computer systems for automatically searching for files on a network and, more particularly, to systems used to locate files on the Internet. The present invention is also directed to software for producing a catalog of the files found on the Internet by such systems.

2. Description of the Invention Background

High-speed networks connect the National Science Foundation ("NSF") supercomputers to form a communications backbone known as the NSFNET. The NSFNET is the foundation for the U.S. segment of the Internet. The Internet is a worldwide network of computers connecting over sixty countries. In addition to those countries having full internet access, there are a large number of countries that have something less than full access to the Internet.

In the early days of the Internet, file transfer over the Internet was performed pursuant to a file transfer protocol or FTP. Sites which contain such files are referred to as FTP sites and that portion of the Internet is often referred to FTP space. See FIG. 1. A system called Archie maintains a data base of FTP file names that reside on approximately 1,500 host computers. Thus, Archie is a tool that can be used to locate FTP files in FTP space.

Another tool for locating files on the Internet was developed by the University of Minnesota and is referred to as Gopher. Gopher is a software application that resides on a host computer. There are more than 5,000 gopher servers today and files residing on the Gopher servers are referred to as Gopher space. See FIG. 1. Although Gopher represented an improvement in user-friendliness, it is impossible to know whether all the information you need about a particular topic resides on the particular Gopher server to which you have connected. Visiting all 5,000 Gopher servers to perform a complete search on a single topic would take an enormous amount of time. Hence, a search tool, Veronica, was developed to search Gopher space.

The latest development on the Internet is the use of the hypertext transfer protocol ("HTTP"). The World Wide Web (WWW) is a part of the Internet and represents all the servers that offer access to HTTP space. See FIG. 1. Client programs, referred to as browsers, such as Mosaic, give the user access to and the ability to download files from the WWW as well as Gopher space and FTP space whenever a file in HTTP space has a pointer to such files.

Use of the Internet is growing at a dramatic pace. For example, in 1983 there were approximately five hundred computers connected to the Internet. Today, there are over three million computers connected to the Internet. Information providers are placing information in the form of files on the Internet at a dramatic pace. The rate of growth by new registered Internet sites is 8% to 10% per month, with over 41,500 sites as of February, 1995. There is no central authority which controls the Internet, edits the material placed on the Internet, or performs any type of supervisory role. Thus, the vast amount of information on the. Internet forms a virtual sea of unorganized, unedited information.

In an effort to bring some order to the chaos, efforts have been made to provide a catalog of the Internet so that files can be quickly located and evaluated to determine if they contain useful information. Because of the vast size of the Internet, specialized types of software, referred to as robots, wanderers, or spiders, have been crawling through the Internet and collecting information about what they find. Such robots, however, quickly caused problems. Whenever a robot gained access to a server, the server could be rendered ineffective for its normal purpose while it processed all of the requests for information generated by the robot software. As a result of numerous complaints, guidelines have been developed in which robots perform a search in a manner which avoids a particular server from being seized by the robot. However, such searches often result in particularly relevant files being passed over in favor of much less relevant files.

A second problem is encountered in dealing with the massive amount of information that is uncovered by the robot. Some form of data selection and/or compression is needed to reduce the amount of data retained in the catalog while at the same time maintaining sufficient data to enable the user to make an intelligent choice about the files to be visited. Thus, the need exists for a software robot which can intelligently search through the files of the Internet and for a mechanism for processing the located files for presentation to an end user in a meaningful manner.

SUMMARY OF THE INVENTION

The present invention is directed to a method of constructing a catalog of the files stored on a network comprised of a plurality of interconnected computers each having a plurality of files stored thereon. The method is comprised of the following steps:

(a) establishing a queue containing at least one address representative of a file stored on one of the interconnected computers;

(b) ranking each address in the queue according to a heuristic;

(c) downloading the file corresponding to the address in the queue having the highest ranking;

(d) processing the downloaded file to generate certain information about the downloaded file for the catalog;

(e) adding to the queue any addresses found in the downloaded file; and (f) repeating steps (b) through (f).

According to one embodiment of the present invention, the heuristic used is popularity. Whenever an address in a downloaded file points to a file stored on a computer other than the host computer storing the downloaded file, a counter for the referenced file is incremented. The value in the counter is a measure of the popularity of the referenced file.

According to one embodiment of the present invention, the downloaded file is processed to provide such information as a significant word list, an excerpt of the downloaded file, the address, size of the file, and number of words therein, and to save the file's title and any headings and subheadings. The significant word list may be used in subsequent searches of the catalog created by the method of the present invention. When a search identifies a file, the information such as the abstract, title, etc. may be provided to an end user who can then determine whether the entire text of the identified file should be downloaded from its original location on the network.

Processing of the files may also include saving information about files mentioned in downloaded files so that that information may be made available during searches even though such files have not be downloaded and fully processed. That enables a catalog to be rapidly constructed according to the method of the present invention. Additionally, because files are downloaded based on their popularity, the files which are added to the catalog are likely to be more important and more meaningful to an end user performing a search in the catalog. Those and other advantages and benefits of the present invention will be apparent from the Description of a Preferred Embodiment hereinbelow.

BRIEF DESCRIPTION OF THE DRAWINGS

For the present invention to be clearly understood and readily practiced, the present invention will be described in conjunction with the following figures wherein.

DESCRIPTION OF A PREFERRED EMBODIMENT

The present invention is directed to a method of using a plurality of computers to locate files on a network and to process the located files in a meaningful way to produce a catalog of the files on the network. The present invention is particularly useful for constructing a catalog of the Internet, although the principles of the present invention may be applied to other types of networks.

Figure 1:
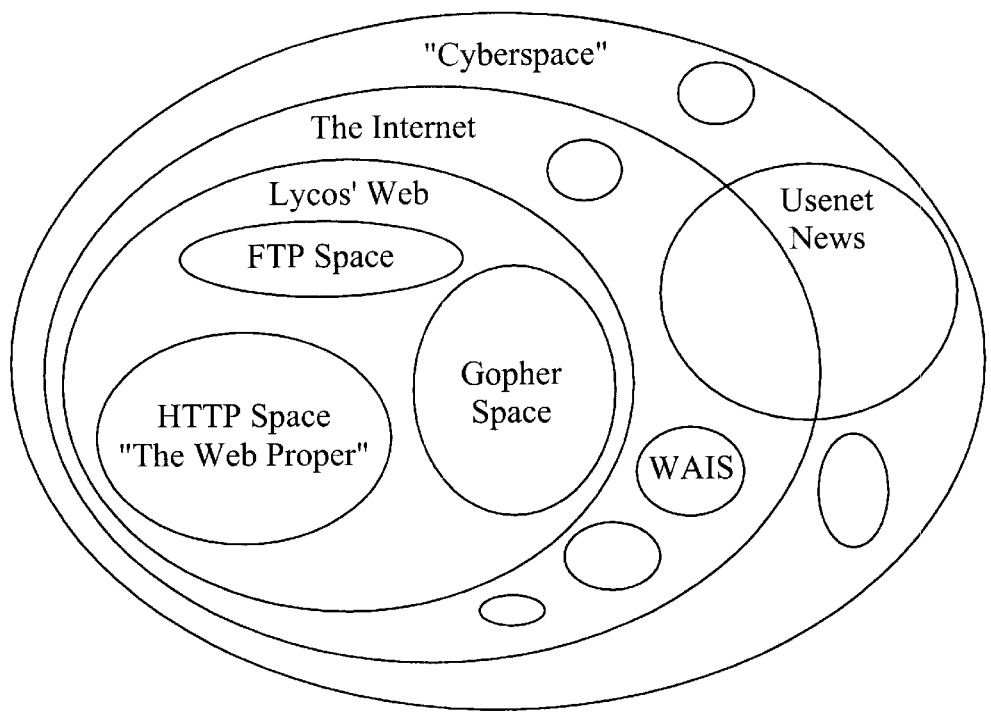
FIG. 1 is a graphical representation of Cyberspace.

Referring to FIG. 1, portions of FIG. 1 have been described above in connection with the Description of the Invention Background. The Internet makes up a large portion of what is referred to popularly as "Cyberspace". As discussed, the Internet is a network of computers upon which files reside. For purposes of convenience, the Internet may be thought of as comprising various types of space, such as FTP space, Gopher space, and HTTP space. The HTTP space is more commonly referred to as the worldwide web or WWW.

The Internet also has other components such as UseNet News which is essentially a giant, distributed, bulletin board system shared by millions of people through hundreds of thousands of computers connected to the Internet. There are currently approximately 6,500 individual UseNet News groups, with 20–30 new groups being added each week. Typically, messages posted on bulletin boards change fairly rapidly. Accordingly, in the preferred embodiment of the method of the present invention, those bulletin boards are not searched such that files appearing, in the UseNet News space are excluded from the catalog of the Internet.

The Internet is also comprised of a group of wide area information servers referred to as the WAIS system. The servers comprising WAIS look for information that resides in individual files or documents. WAIS is another portion of the Internet which is excluded from the search performed by the preferred embodiment of the method of present invention. Thus, as seen in FIG. 1, the present invention searches HTTP space and, when pointers are found to FTP space or Gopher space, that space is also searched. In FIG. 1, the portion of the Internet which is searched and cataloged by the present invention is referred to as the Lycos web.

Figure 2:
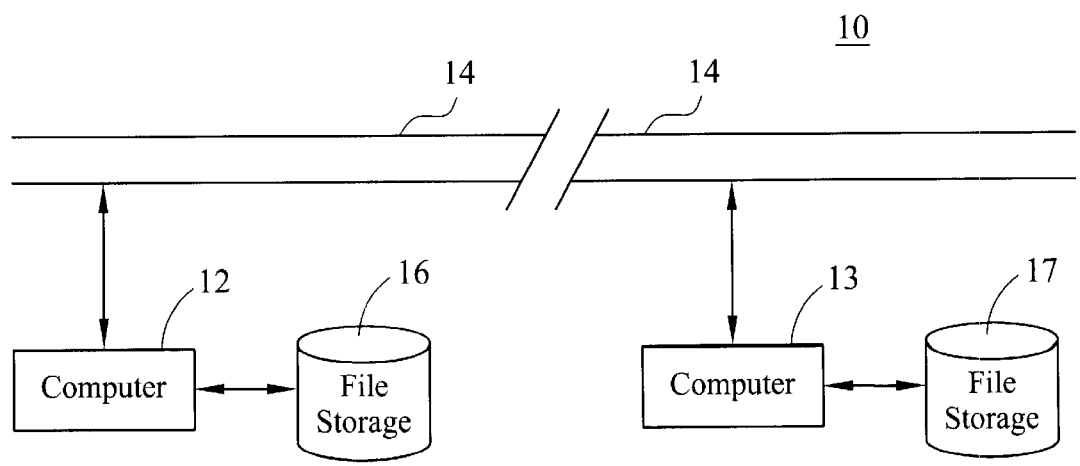
FIG. 2 is a block diagram of a logical view of the Internet.

Referring now to FIG. 2, FIG. 2 illustrates a block diagram of a logical view of the Internet. As previously mentioned, the Internet 10 is a network of individual computers 12, 13 interconnected via a communications link 14. Each computer 12, 13 has files stored in a storage device 16, 17, respectively, of well known type.

In FIG. 2, computer 12 could be located, for example, in Pittsburgh, Pa., whereas computer 13 could be located in Hawaii. A user in Pittsburgh could use computer 12 to access computer 13 through the communications channel 14 to thereby access files stored in storage device 17. As previously mentioned, there are millions of computers like computers 12, 13 connected to a plurality of communications channels 14 thereby providing access to a vast amount of data stored in file storage devices 16, 17. One of the goals of the present invention is to access all of the computers connected to the Internet, excluding those previously mentioned as being excluded in the preferred embodiment, review the files available in the computers' file storage devices, and produce a catalog of the files thus found. A block diagram illustrating the relationship between the present invention and the Internet is illustrated in FIG. 3.

Figure 3:
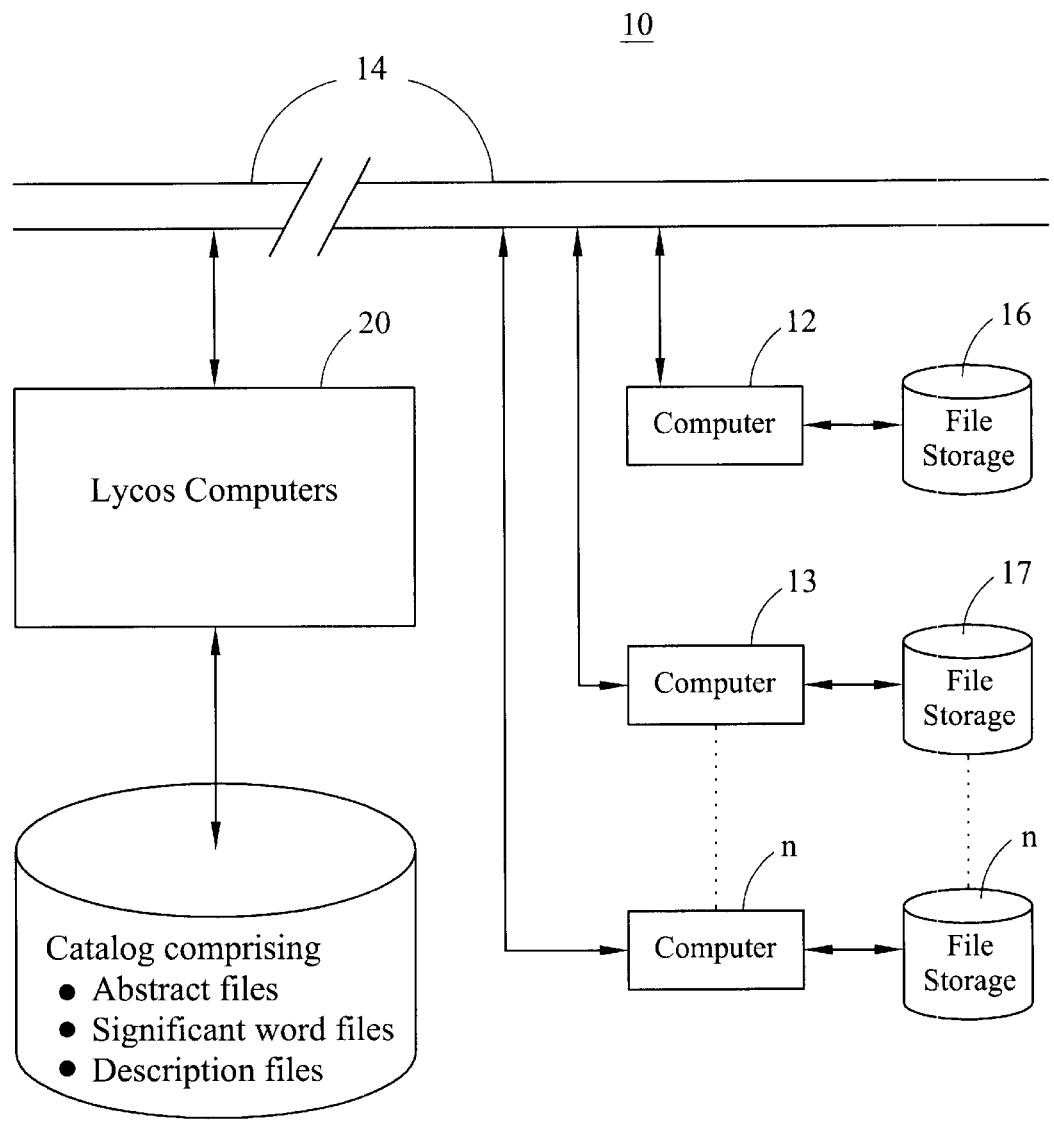
FIG. 3 is a block diagram illustrating the relationship between the present invention and the Internet.

In FIG. 3, the communications channel 14 is illustrated as well as computers 12 and 13 through n and associated storage devices 16 and 17 through n, respectively. In FIG. 3, a group of computers 20, referred to as the Lycos™ computers, contain the software robots which index the other computers 12 and 13 through n through the communications channel 14 and download files from the various storage devices 16 and 17 through n connected to each of the computers 12 and 13 through n, respectively. After the files have been downloaded, a data base is constructed which is a catalog of not only the files which have been downloaded for analysis, but other files referred to in the downloaded files. The manner in which the files are downloaded and the manner in which the files are processed to create the catalog are discussed in greater detail hereinbelow. It is necessary, however, to first have an understanding of the concept of referencing and an understanding of various different types of search techniques. Those concepts are discussed in conjunction with FIGS. 4 and 5, respectively.

Figure 4:
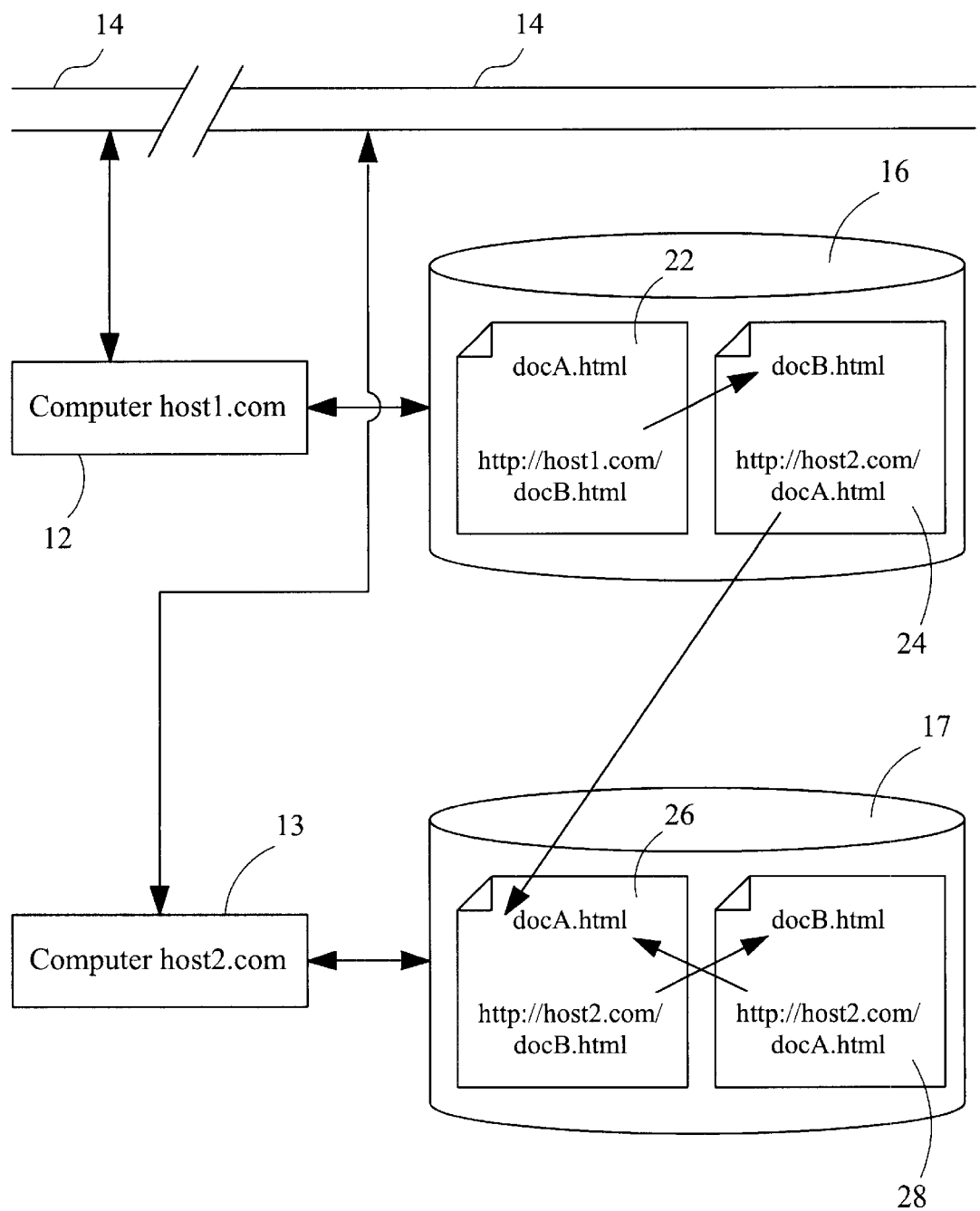
FIG. 4 illustrates files residing on various servers with pointers to files residing both on the same server and on other servers.

In FIG. 4, computer 12 is referred to as "host1.com" while computer 13 is referred to as "host2.com". The data storage device 16 in communication with computer 12 is shown as having two documents or files residing thereon. The first file 22 is referred to as "docA.html". It is seen that file 22, in addition to containing data (not shown), contains an address, identified as "http://host1.com/docB.html". An address may also be called a pointer because it "points to" another file. That file is file 24, referred to as "docB.html". The pointer indicates that file 24 resides on the same data storage device 16 as file 22 by virtue of the reference to "host1.com" in the pointer.

File 24 similarly has a pointer, identified as "http://host2.com/docA.html", to another file, file 26, referred to as "docA.html", which resides on data storage device 17 associated with computer 13. It is seen that the name for file 26 is the same as the name for file 22, but the information in the pointer identifying "host2.com" means that it is file 26 and not file 22 to which the pointer in file 24 is pointing. File 26 contains a pointer to another file, file 28, which has a pointer referring back to file 26. Through the use of such pointers, it is possible for files to reference other files which reside not only on the same data storage device, but on other data storage devices, which can be physically remote from the data storage device on which the original file resides. Because of the interrelationship of files via pointers, it is necessary to choose a search technique so that the files may be searched in a logical manner. Three such search techniques are illustrated in FIGS. 5A, 5B, and 5C.

Figure 5A:
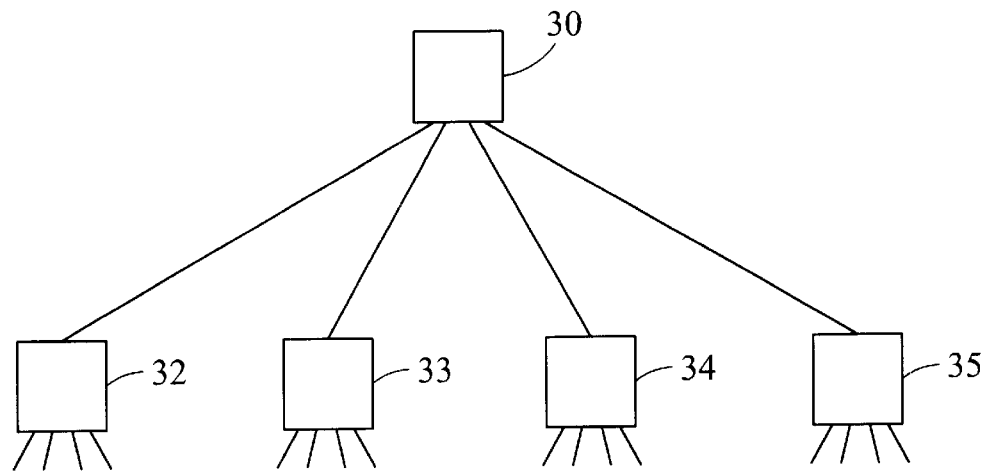
FIG. 5A illustrates a breadth first search.

In FIG. 5A, a breadth first search is illustrated. As seen in the figure, a file 30 is downloaded. File 30 has four pointers to files 32, 33, 34, and 35. Each of files 32–35 have a plurality of pointers to other files which are not shown. However, before any of the files to which files 32–35 are pointing are downloaded, each of files 32–35 will first be downloaded. Thus, in a breadth first search, a catalog of files may be built in a row-like hierarchy.

Figure 5B:
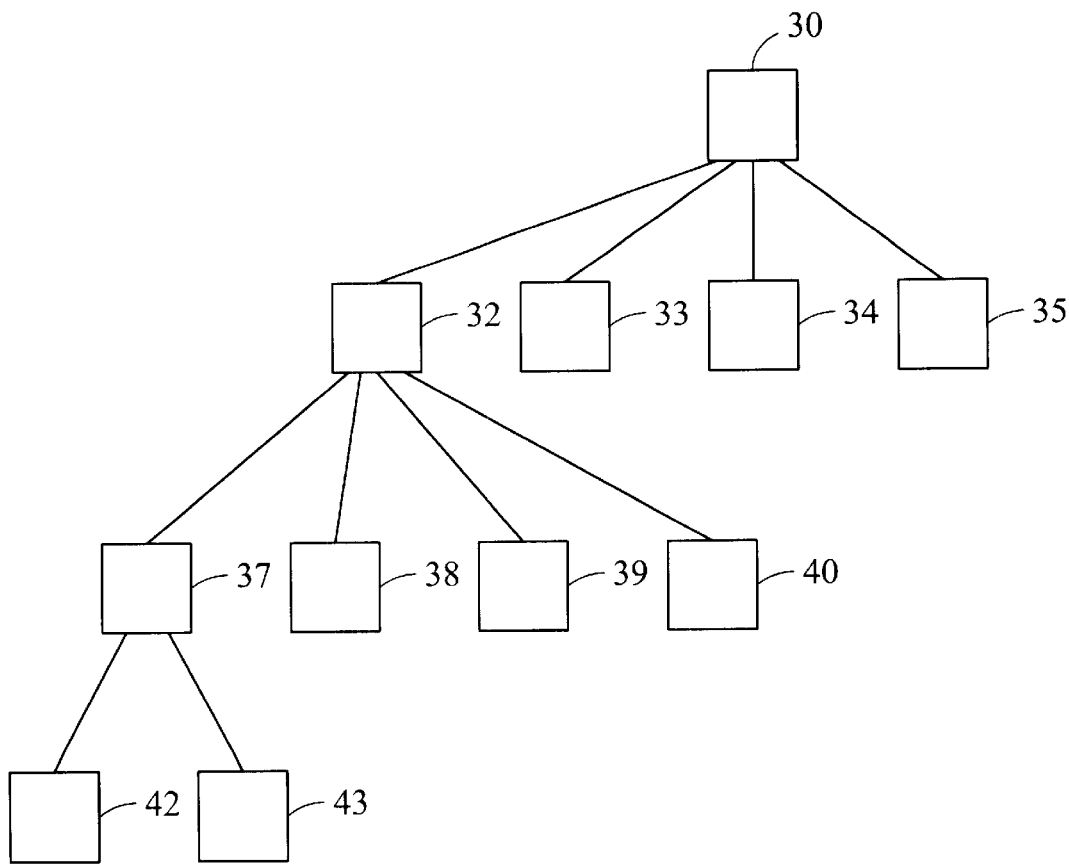
FIG. 5B illustrates a depth first search.

In FIG. 5B, a depth first search is illustrated. In FIG. 5B, again file 30 is downloaded and it is learned that file 30 has pointers to files 32–35. However, when file 32 is downloaded, it is learned that file 32 has pointers to files 37, 38, 39, and 40. Before files 33 or 38 are downloaded, file 37 is downloaded. When file 37 is downloaded, it is learned that it has two pointers to files 42 and 43. Before file 43 is downloaded, file 42 is downloaded to determine if it has any a pointers to any files. The process is carried out until a file is reached which has no pointers. It is thus seen that the depth first search is the opposite of the breadth first search in that a catalog of files may be built in a column-like hierarchy.

Figure 5C:
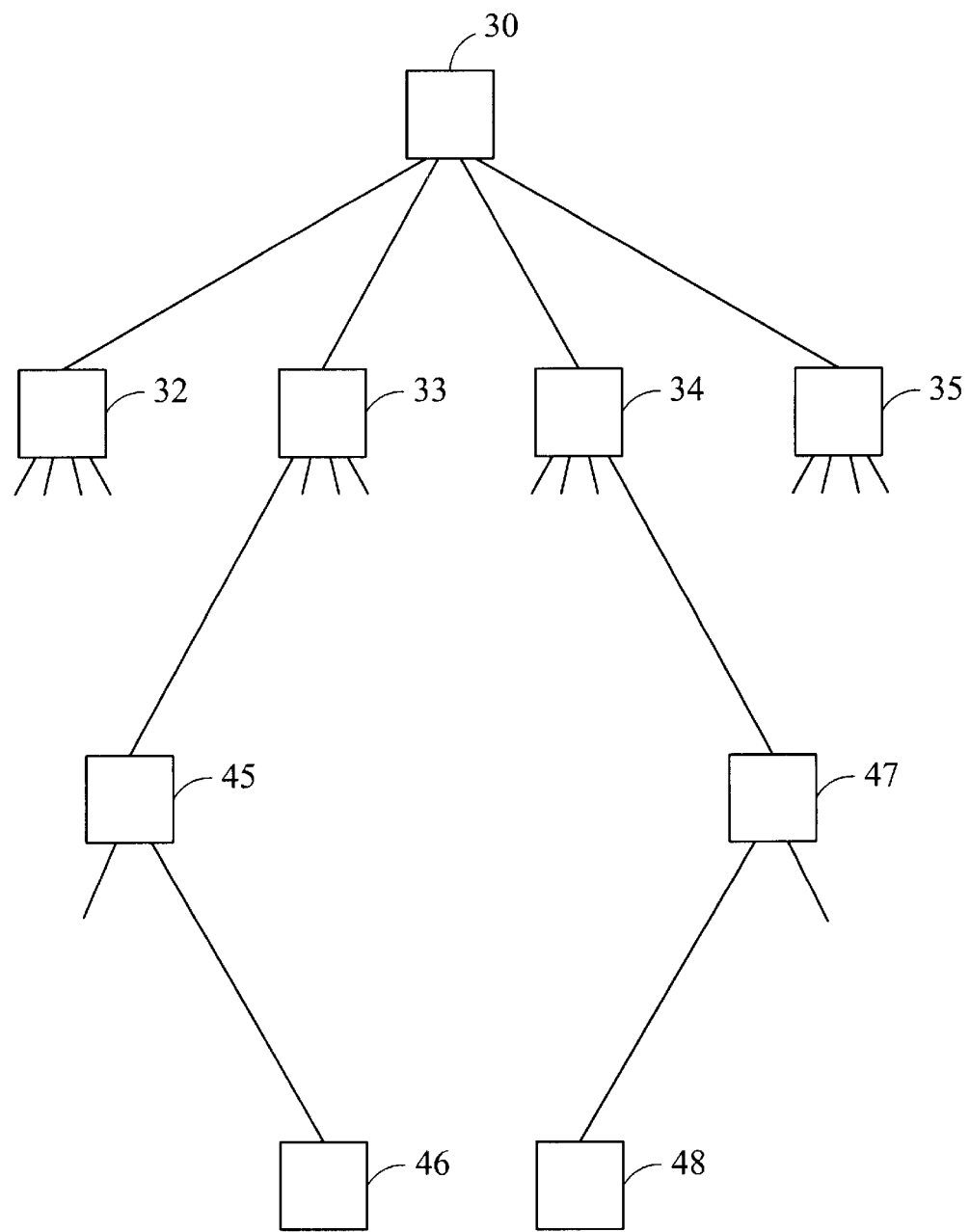
FIG. 5C illustrates a heuristic search.

Illustrated in FIG. 5C is a heuristic type of search. Again, file 30 is downloaded and it is learned that file 30 has pointers to files 32–35. However, some heuristic is applied to the search so that as between files 32–35 there is a preference for file 33 which is downloaded first. Of the four pointers in file 33, the heuristic identifies file 45 as being of particular interest so the search proceeds by downloading file 45. As a result, the files are searched neither in a breadth first nor a depth first manner, but are searched based on a preference determined by the particular heuristic used. The search may proceed in a manner which at times appears to be breadth first, at other times appears to be depth first, and may at times, without an understanding of the heuristic being applied, appear to be random.

As is appreciated by those of ordinary skill in the art, both the depth first and breadth first type of searches are extremely limited. Because of the mechanical application of the search criterion, very interesting files may often be passed over in favor of much less interesting files simply because of the highly structured nature of the search. When searching a large file server containing numerous files with pointers to other file servers, particularly interesting files may go uncataloged. Similarly, when updating a search, particularly interesting files may go undetected. As a result, the heuristic search technique is preferred. However, select-ing an appropriate heuristic which provides the flexibility to pass over uninteresting files in favor of interesting files while at the same time being easy to code represents a substantial challenge to those in the art. It is, thus, one object of the present invention to develop a heuristic which provides a very powerful method of searching while at the same time is relatively easy to implement.

Figure 6:
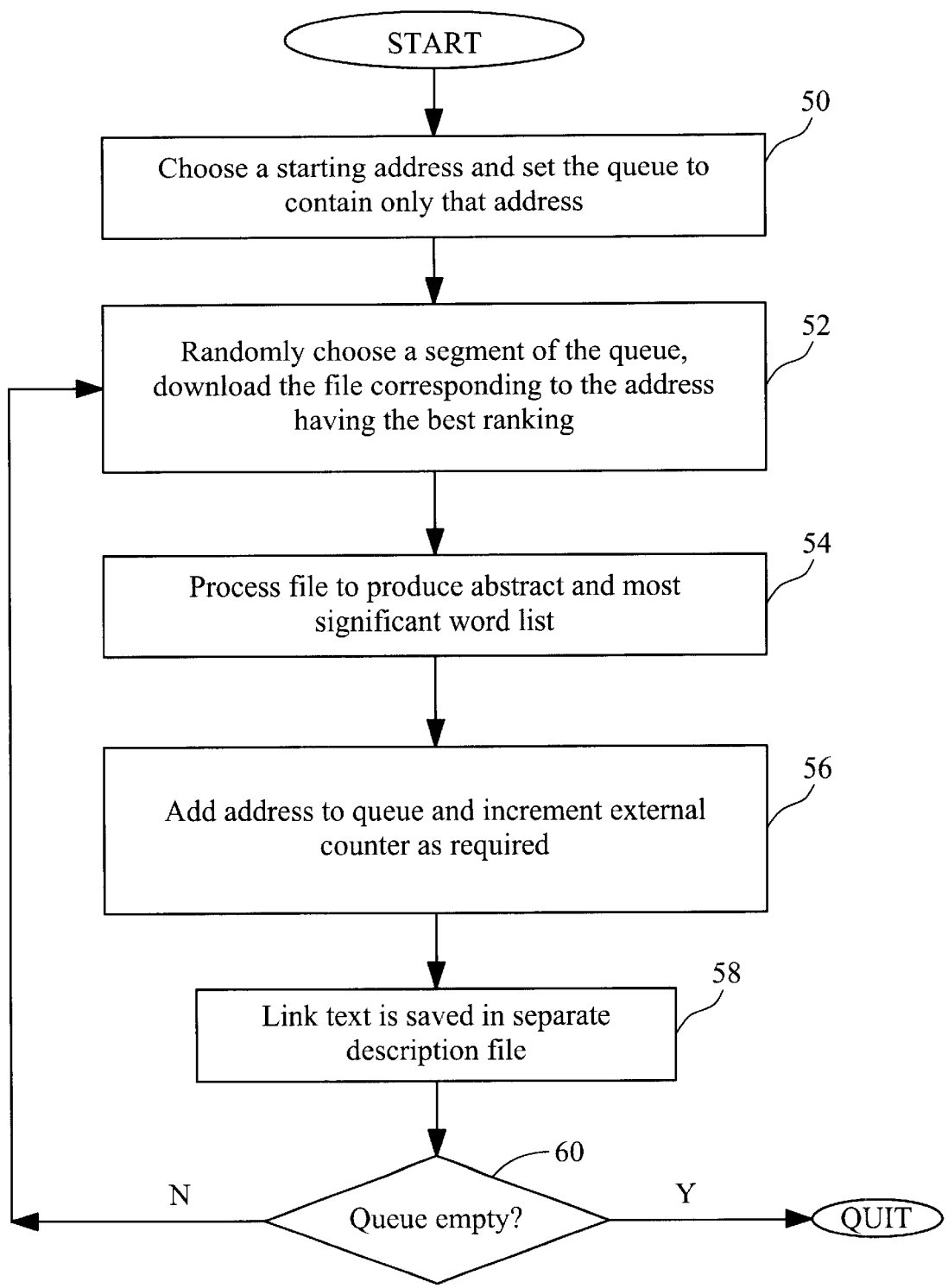
FIG. 6 is a flow chart illustrating the details of how files are selected for downloading.

Turning now to FIG. 6, in FIG. 6 a flow chart illustrating the details of how files are selected for downloading is illustrated. The search technique of the present invention may start at step 50 wherein an address is placed in a queue, 51 shown in FIG. 7b. In the context of the WWW, addresses are commonly referred to as Uniform Resource Locators or "URLs". Normally, after only a short time, the queue 51 will contain numerous addresses such that step 50 likely will be performed only as needed to "prime" the system and insure that at least one address is in the queue for examination.

At step 52, it is necessary to select which file from the queue should be downloaded. If the queue is too large, I randomly select a section of the queue, for example two hundred addresses, by randomly selecting some address in the queue as the first address of the selected series. By making such a selection, the number of addresses to be examined to determine which one to select becomes a manageable task.

Once some section of the queue is randomly selected, or using the entire queue if it is of manageable size, it is necessary to select which file to download. I prefer to use a popularity weighting heuristic. I also have a preference for server home pages, user home pages, and shorter addresses, which may be used to differential between files of equal popularity. By using the popularity weighting heuristic, and exercising a preference for the aforementioned types of files, each address can be given a score, and the address with the highest ranking score is downloaded.

After a file corresponding to the address with the highest ranking score is downloaded, it is processed in step 54. The processing of downloaded files to create an abstract and a most significant word list is discussed in detail in conjunction with FIG. 7a. When processing of the file at step 54 is complete, the addresses in the file are added to the end of the queue at step 56. Additionally at step 56, if the downloaded file and referenced file are on different hosts, an external reference count on the referenced file is incremented. The external reference count is an indication of popularity, and the external reference count is the popularity weight used in the heuristic described above.

At step 58, link text, which is text associated with an address, is stored in a separate description file. It is the description files which provide information about files not downloaded but referenced in a downloaded file. An explanation of the creation of the description files is provided hereinbelow in conjunction with FIG. 9. At step 60, a decision is made if all of the files in the queue have been downloaded and processing stops when the queue is empty. If the queue is not empty, process control returns to step 52 and a new section of the queue is randomly selected and the address in that new segment with the highest ranking score is downloaded. In that manner, I am always selecting the most popular file, if not in the entire queue at least in the randomly selected portion of the queue, for downloading.

Figure 7A:
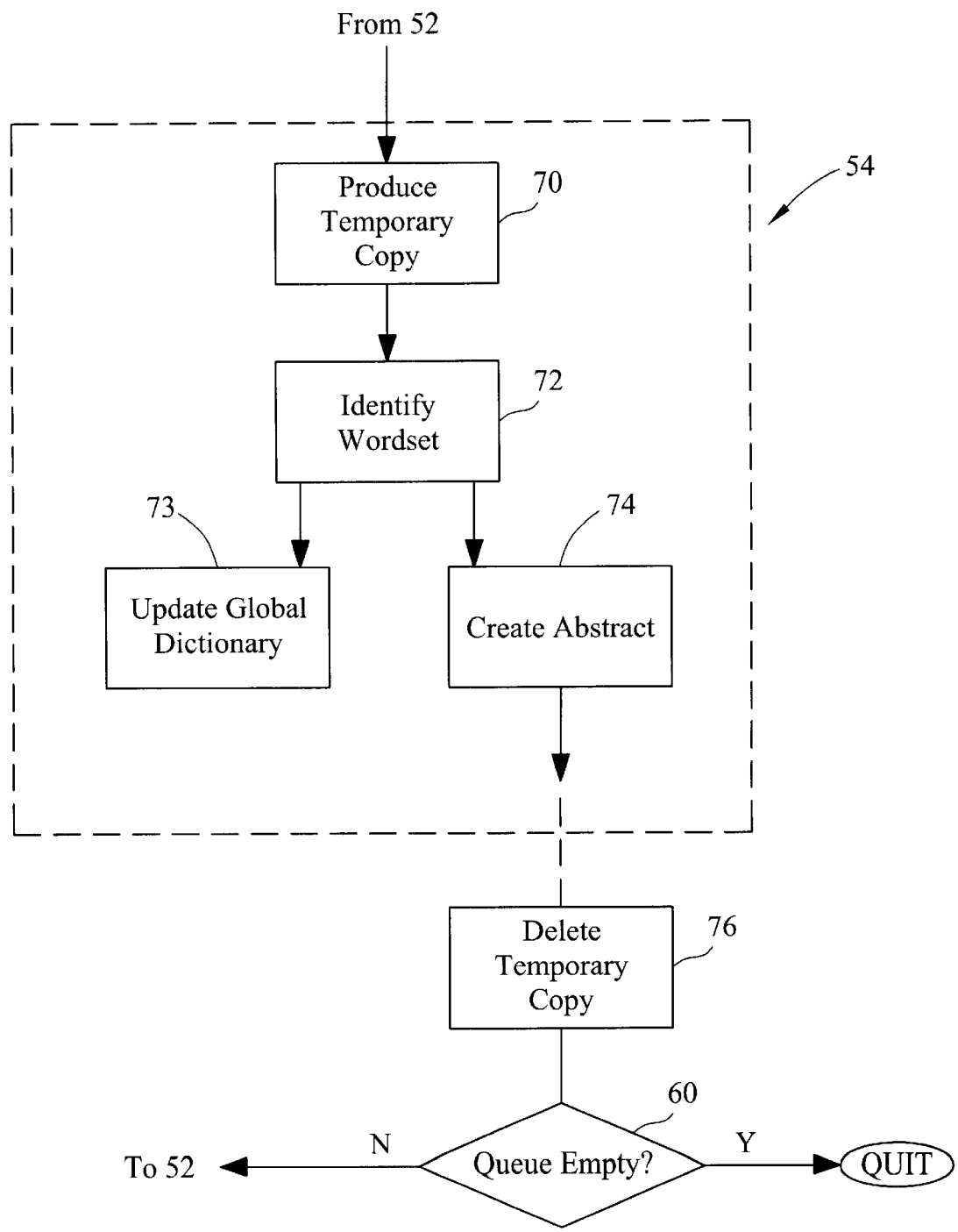
FIGS. 7a and 7b illustrate how the downloaded files are processed.

FIG. 7a is an explanation of the processing step 54 of FIG. 6. After a file is downloaded in step 52 of FIG. 6, a complete copy of the file is initially stored on one of the Lycos computers at step 70 in FIG. 7a. I refer to that initial copy of the file as the "temporary copy" because after processing, as described below, the file is deleted at step 76.

After the temporary copy is made, certain statistical analyses are performed at step 72 to identify a word set, which is currently, but need not be, the one hundred most significant words appearing in the file. As each word is read, I increment, in step 73, a count in a global dictionary. For every word in the downloaded document, I compute a significance measure. I use the well-known term frequency—inverse document frequency measure. Words in the downloaded document are sorted by significance measure, and the most significant are saved in a most significant word list, currently one hundred words per downloaded file. The processing required to identify the significant word set is computationally intensive. The significant word set is then stored in a manner so that the word set is associated with the file's address. The word set is used for searching purposes, as discussed later, and is not typically displayed to the end-user.

The second type of processing that is performed on the temporary copy is to create an abstract at step 74. The abstract is made available to the end user and contains, but need not be limited to, the following information: title, headings and subheadings, excerpt, size in bytes, and number of words. The excerpt is currently, but need not be limited to, the lesser of the first twenty lines, chopping each line to two hundred characters if necessary, or twenty percent of the file, whichever is less. The abstract is stored in a manner so that the abstract can be retrieved later along with the file's address by an end user performing a search in the catalog of the Internet to enable the end user to determine if the entire file should be downloaded from the file's original location on the Internet. After the word set and the abstract have been created, process control proceeds with the steps of FIG. 6. After the link text is saved, step 58 in FIG. 6, I have no further need for a complete copy of the downloaded file so the temporary copy is deleted at step 76. Thereafter, process control proceeds with decision step 60.

Figure 7B:
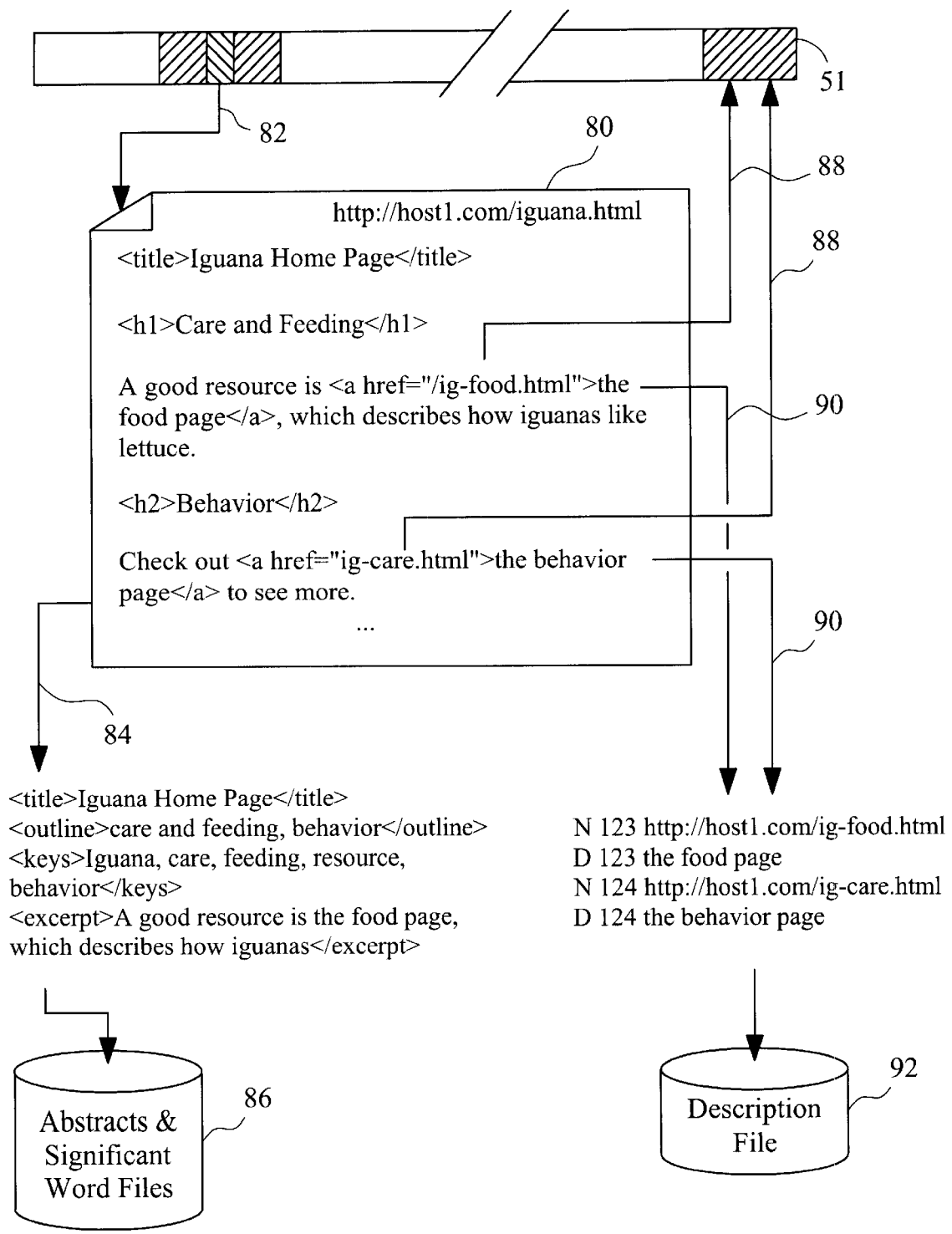

FIG. 7b is a logical representations of how information, contained by a file 80 is processed and used by the present invention. The arrow 82 indicates that the address for the file 80 had the highest ranking score of the all the addresses in the randomly selected section of the queue 51 being examined, so file 80 was downloaded. The arrow 84 is representative of how all the information contained in file 80 is used as described in FIG. 7a to create an abstract file and a most significant word file 86. The arrows 88 illustrate how addresses found in file 80 are added to the end of queue 51. Finally, arrows 90 illustrate how link text found in file 80 is saved in a description file 92.

Figure 8:
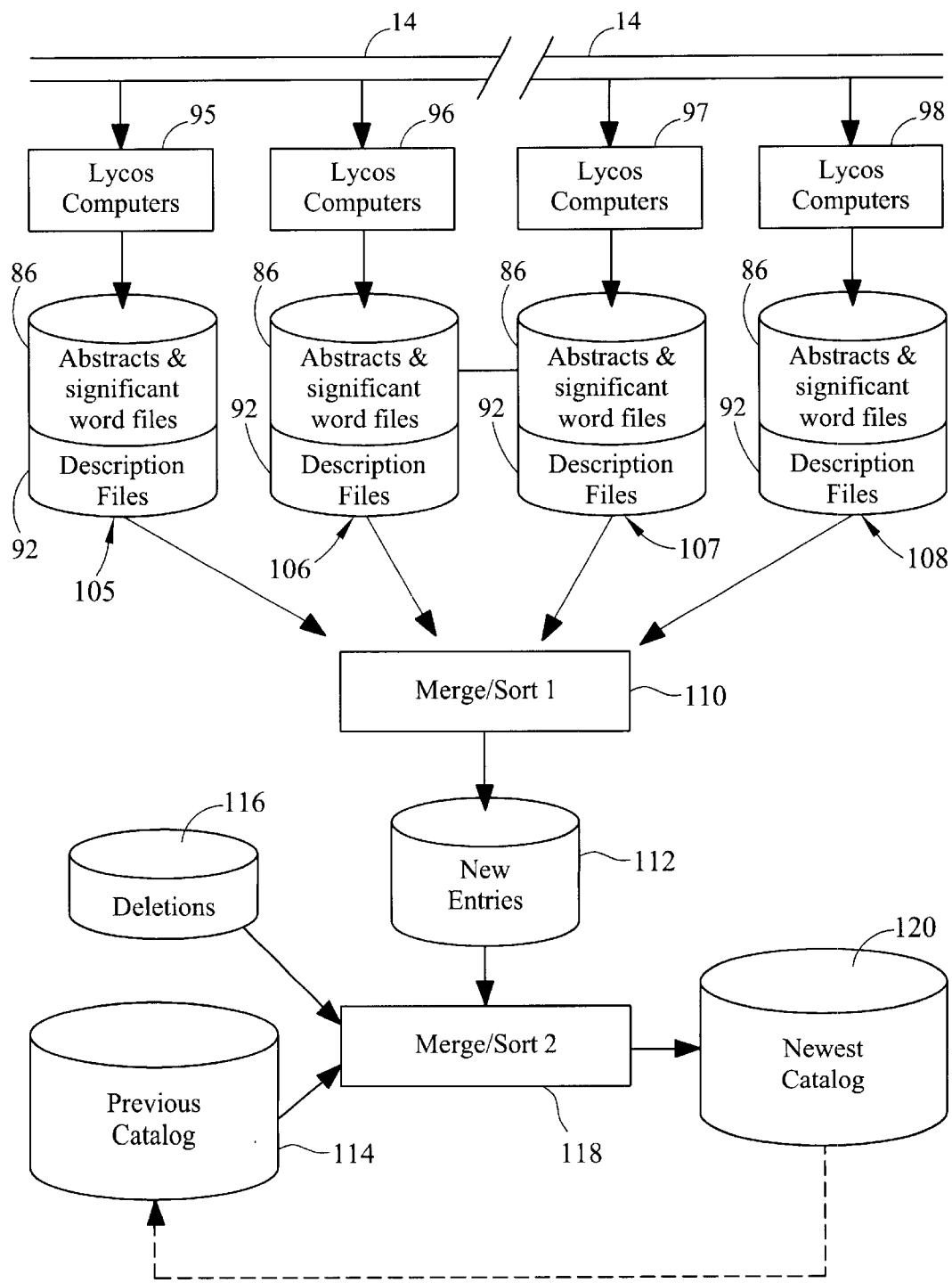
FIG. 8 illustrates the details of the creation of a newest catalog from a previous catalog and new information obtained from the Internet.

FIG. 8 illustrates how the individual abstract and significant word files 86 and description files 92 are merged as well as the details of how a newest catalog is created from a previous catalog and new information obtained from the Internet. In FIG. 8, a plurality of Lycos computers 95, 96, 97, 98 is shown connected to the communication link 14. Each computer 95–98 may be searching the Internet and retrieving files therefrom. Each computer 95, 96, 97, 98 has a memory device 105, 106, 107, 108, respectively, responsive thereto. Each of the computers 95–98 is processing the downloaded files as shown in FIG. 76 so as to produce individual abstract and significant word files 86 and description files 92.

Periodically, all of the individual files 86 are merged together as are all of the files 92 in merge/sort step 110 to produce a new entries data base 112. Merge/sort step 110 may be carried out by one of the computers 95–98 or by a separate computer, not shown. The new entries data base 112 is combined with a previous instance of the catalog 114, along with deletion data base 116 which identifies any files to be deleted, in a second merge/sort step 118. The result of the second merge/sort step 118 is the newest instance of the catalog 120. The newest instance of the catalog 120 becomes the previous instance of the catalog 114 the next time that the second merge/sort step 118 is carried out. To date, the catalog 120 contains over four million addresses representing over seven hundred thousand files which have been abstracted and over three million three hundred thousand files which have been described.

Figure 9:
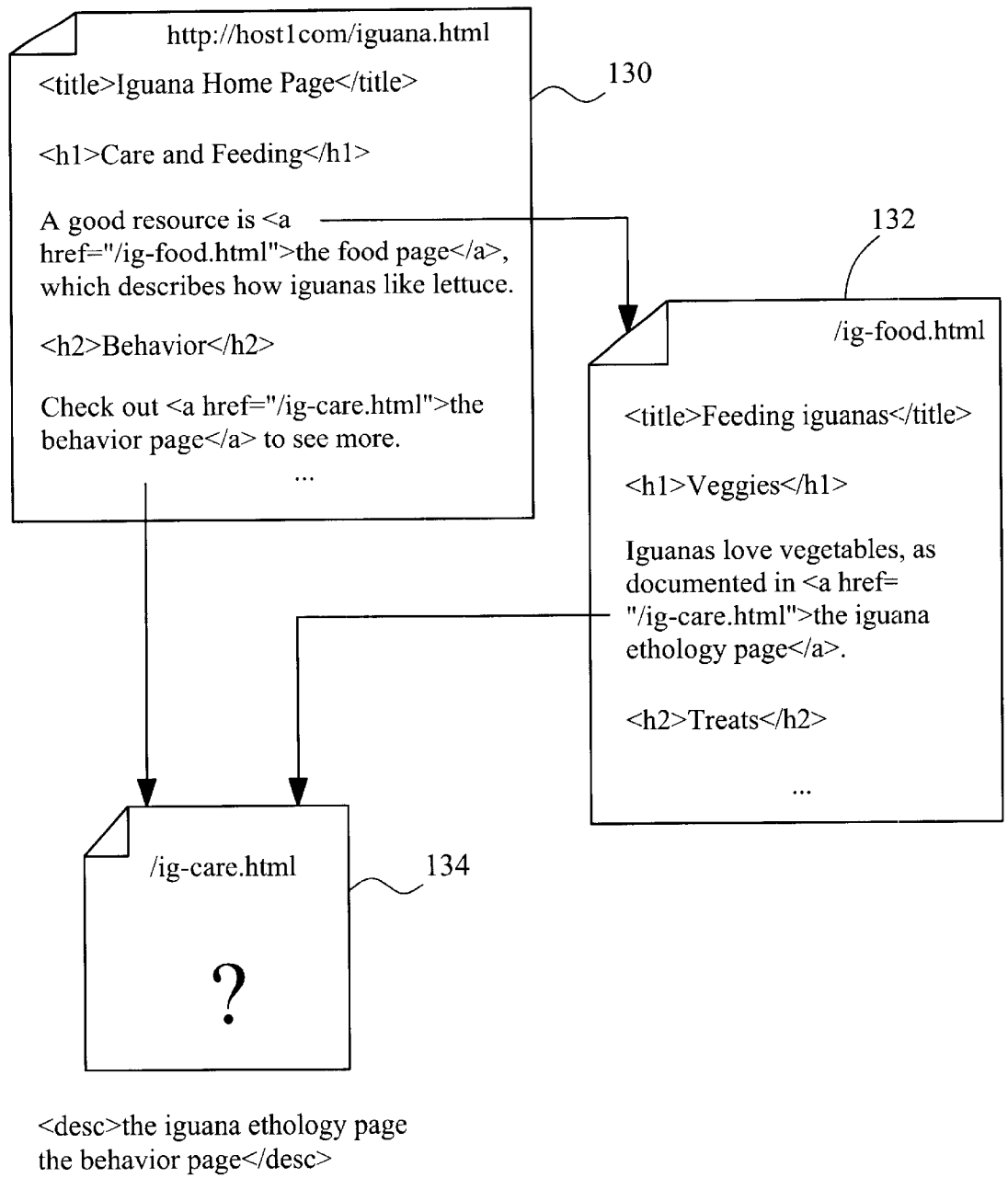
FIG. 9 is a logical representation of how the merge operation of FIG. 8 may be used to assign link text to a file not yet downloaded.

FIG. 9 is a logical representation of how information stored in description files 92 may be merged. As shown in FIG. 9, by combining the link text from downloaded file 130 with the link text from downloaded file 132, text can be assigned to file 134 which has not been downloaded. In the example shown, the search query "iguana behaviors" retrieves file 134 because the link text from file 130 about file 134 matches "behavior" and the link text from file 132 about file 134 matches "iguana".

The logic of the merging operation shown in FIG. 9 is also applied to the merging of downloaded files. In cases where the same file has been downloaded more than once, the most recent information is selected for use in the catalog.

Figure 10:
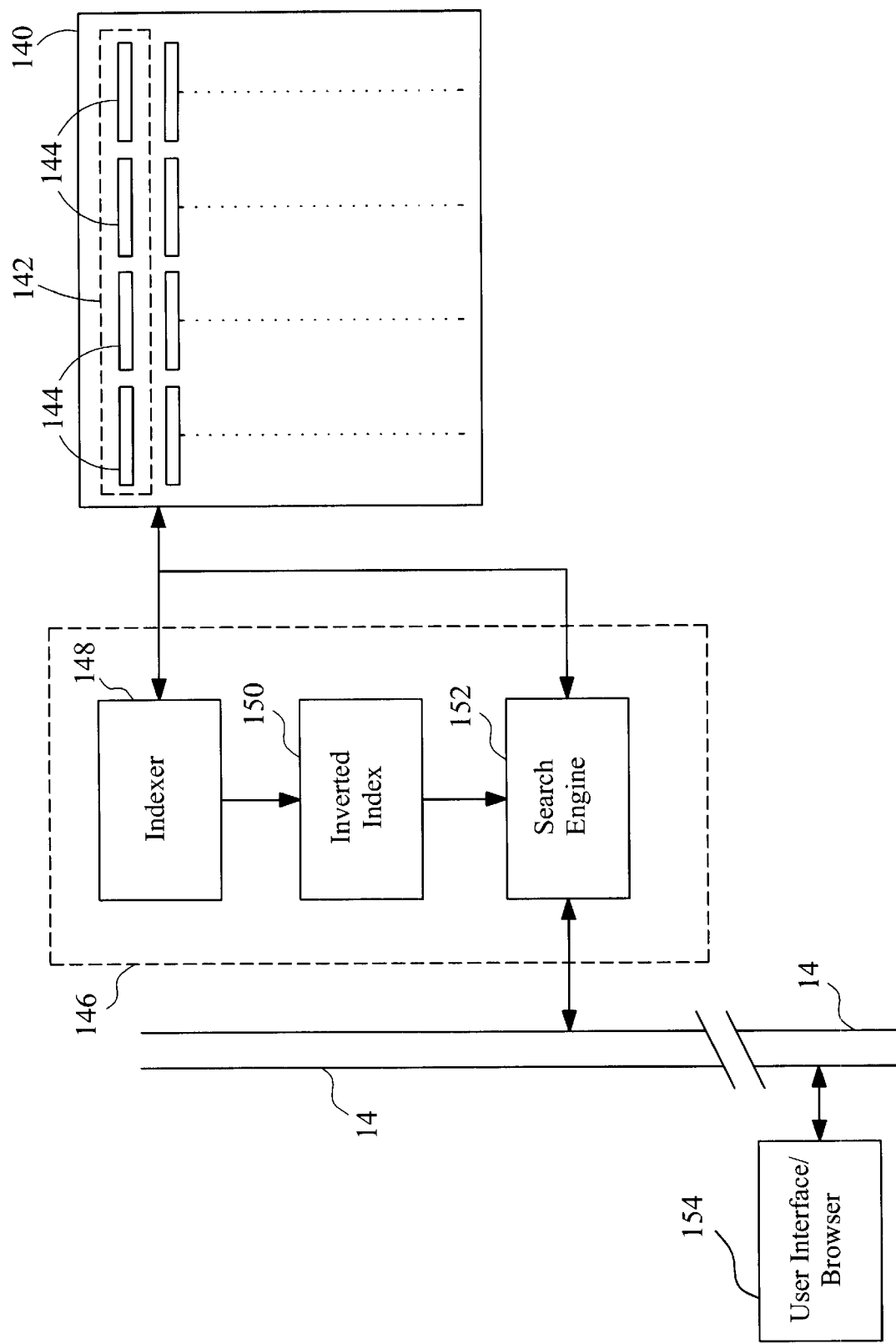
FIG. 10 illustrates a system for enabling an end user to use the catalog of the present invention to perform a search.

The catalog produced by the method of the present invention may be made available for searching through a variety of different modalities. For example, the catalog could be sold as a compact disc for off-line searching. Alternatively, the catalog could be made available for on-line searching as shown in FIG. 10 which illustrates a system for enabling an end user to use the catalog of the present invention to perform an on-line search. The catalog is a data base stored in a memory device 140. The database is partitioned into a plurality of database objects 142, with each database object 142 storing information about one file. Each database object 142 may include a number of fields 144 which may include, but need not be limited to, a title field, a heading field, a subheading field, an excerpt field, a size field, a word count field, and a most significant word field.

FIG. 10 also illustrates an indexing/retrieval system 146 which is comprised of an indexer 148. The indexer 148 may be responsive to any one or all of the fields 144 in the database, for example, the most significant word field, to produce an inverted index 150. The indexing/retrieval system 146 also includes a search engine 152.

A user accesses the indexing/retrieval system 146 through an interface device 154, such as a personal computer, which is running some type of browser software. The browsing software accesses the search engine 152 which then performs a comparison of user supplied search criteria to the terms in the inverted index 150. If one or more matches are found, that means that there are objects in the catalog that meet the search criteria. The search engine 152 retrieves one or more of the fields from the objects that meet the search criteria and displays those to the end user on the user interface 154. If, after reading the displayed fields, such as the excerpt field, the end user concurs that the file is relevant, the entire file may be downloaded by the user from the file's original location on the Internet.

While the present invention has been described in conjunction with preferred embodiments thereof, those of ordinary skill in the art will recognize that many modifications and variations may be implemented. The present disclosure and the following claims are intended to encompass all such modifications and variations.

What I claim is:

1. A method of constructing an entry in a catalog of files stored on a network, comprising:

downloading a first file containing link text about a second file on the network and not downloaded;

creating an entry in the catalog corresponding to a network address of the second file; and assigning the link text from the first file as a description of the second file.

2. The method of claim 1, additionally comprising the steps of:

downloading a third file containing link text about the second file; and adding the link text from the third file to the description of the second file.

3. A method of constructing an entry in a catalog of files stored on a network, comprising:

downloading files for processing;

saving link text from the downloaded files and network address information associated with the link text; and using the network address information and the link text to create an entry in the catalog for a file not downloaded from the network for processing.

* * * * *